United States Patent [19]

Johnson

[11] Patent Number: 5,245,003
[45] Date of Patent: Sep. 14, 1993

US005245003A

[54] TERNARY MIXTURES OF GLYCOLS AND WATER THAT RETAIN FLUIDITY AT AMBIENT TEMPERATURES

[75] Inventor: Larry K. Johnson, Kingsport, Tenn.

[73] Assignee: Eastman Kodak Company, Rochester, N.Y.

[21] Appl. No.: 824,276

[22] Filed: Jan. 23, 1992

[51] Int. Cl.$^5$ .............................................. C08G 63/02
[52] U.S. Cl. .................................. 528/272; 528/296; 528/298; 528/301; 528/307; 528/308; 528/308.6; 560/179; 560/189; 560/263; 568/853
[58] Field of Search ............... 528/272, 296, 298, 301, 528/307, 308, 308.6; 560/179, 189, 263; 568/853

[56] References Cited

U.S. PATENT DOCUMENTS

| | | | |
|---|---|---|---|
| 4,294,751 | 10/1981 | Gardner | 523/513 |
| 4,313,890 | 2/1982 | Chu et al. | 554/162 |
| 4,351,927 | 9/1982 | McCollum et al. | 525/437 |
| 4,474,939 | 10/1984 | Holzrichter | 528/272 |
| 4,851,592 | 7/1989 | Morris | 568/853 |
| 4,990,593 | 2/1991 | Blount | 528/272 |
| 5,024,772 | 6/1991 | Thurman et al. | 252/1 |

Primary Examiner—Samuel A. Acquah
Attorney, Agent, or Firm—Bernard J. Graves, Jr.; William P. Heath, Jr.

[57] ABSTRACT

Provided are certain novel fluid ternary glycol mixtures. Also provided is an improved process for preparing polyesters comprised of residues of the glycols which comprise the fluid ternary glycol/water mixtures.

4 Claims, No Drawings

TERNARY MIXTURES OF GLYCOLS AND WATER THAT RETAIN FLUIDITY AT AMBIENT TEMPERATURES

FIELD OF THE INVENTION

This invention belongs to the field of organic chemistry. More particularly, this invention relates to fluid ternary mixtures of certain semisolid glycols.

BACKGROUND OF THE INVENTION

Mixtures of low melting glycols in wide composition ranges which include their eutectic point are made to either retain fluidity during normal materials storage or to retain fluidity rapidly upon return of the material to room temperature by the addition of small to moderate amounts of water. These liquid forms provide distinct advantages over storage of the solid forms of these mixtures to users for polycondensation reactions.

The physical handling of low melting solids is often difficult because of their tendency to clump together when stored as a solid. This is especially true for a number of glycols used for the synthesis of polyester polymers. When the requirements for such materials are large, facilities for molten storage of these materials may be justified. The capital required to install and to maintain these facilities is often substantial because heating is required.

A second means of providing a fluid product is available if the material has sufficient water solubility that the addition of a small, fixed amount of water will impart a freezing point that is low enough to permit pumping at ordinary temperatures. Examples of the latter situation include 2,2 dimethyl 1,3 propanediol (NPG Glycol) and 1,4 cyclohexanedimethanol (CHDM) which are routinely mixed with 10 weight percent water to provide fluid materials.

An alternative means of providing low melting glycols in a fluid form has been exemplified in U.S. Pat. No. 4,474,939. This procedure involves the formation of eutectic mixtures of glycols which retain fluidity at or near room temperature. The glycols taught in this patent are NPG Glycol, cyclohexanedimethanol(CHDM), 1,6 hexanediol, and 2,2,4 trimethylpentane 1,3 diol (TMPD). These eutectic mixtures are claimed to offer benefits both in terms of material handling and properties of polyester resins produced therefrom them.

Recently, L.R. Thurman, et al. disclosed in European Patent Application Publication No. 0 410 167 that NPG Glycol also forms a eutectic mixture with 2,2-dimethyl-3-hydroxypropyl 2,2-dimethyl 3 -hydroxypropionate (hydroxypivalyl hydroxypivalate or HPHP). However, this binary mixture, upon cooling to, for example, 0° C., will solidify and will not spontaneously become fluid upon warming to room temperature; the present invention as described below, provides a solution to this problem. The Thurman reference describes a method for producing such mixtures from a by product stream.

SUMMARY OF THE INVENTION

This invention provides fluid ternary mixtures of certain glycols and water. In particular, stable mixtures of 2,2-dimethyl 1,3-propanediol, 2,2-dimethyl-3-hydroxypropyl 2,2-dimethyl 3-hydroxy-propionate and water; 2,2-dimethyl 1,3-propanediol 2-butyl-2-ethylpropanediol, and water; and 2,2-dimethyl 3-hydroxy propyl 2,2-dimethyl 3-hydroxypropionate, and 2-butyl 2-ethyl propanediol, and optionally water. Also provided herein is an improved process for preparing polyesters comprised of the above glycol residues, said process providing the advantage of ease of handling of the starting material glycols.

DETAILED DESCRIPTION OF THE INVENTION

We have discovered that eutectic mixtures exist for NPG Glycol and 2-butyl 2-ethyl I,3-propanediol (BEPD) as well as for HPHP and BEPD. Mixtures of 65 85% BEPD and 13–15 35% NPG all remain fluid in the laboratory indefinitely. All of these mixtures crystallize upon cooling below 0-degrees C. Upon sitting at room temperature, all mixtures remain crystalline except for the one containing 65% BEPD. Similarly, mixtures of 45–65% BEPD with HPHP retain fluidity. The mixture having the best low temperature stability consisted of 45% HPHP/55% BEPD.

The existence of an eutectic mixture is not a guarantee that the blend will remain fluid at ordinary temperatures of storage. Extremes may range from −40 F( −40° C.) to +140° F.(+60° C.). For low melting glycols, the upper extremes are generally not a problem, but the low temperatures often result in crystallization of the eutectic mixture. For mixtures with melting points at or slightly above room temperature, e.g., NPG/HPHP, external heating will be required to return the material to a fluid state. While eutectics do represent an improvement in the physical form for users that have a need for blends of the two products, they do not necessarily solve the physical handling problems.

Although the addition of water to single glycols has been used effectively to fluidize individual glycols, it is not readily apparent that water would have the desired effect on mixtures of glycols, because each molecule has unique solubility characteristics with water and with the other glycol molecules. The balance of hydrophilic and hydrophobic tendencies for each molecule can lead to phase separations that may occur as the temperature changes. Such deviations would lead to the nonuniform introduction of raw materials into a polycondensation reaction that would change the composition of the ultimate product.

This invention discloses unique compositions of various glycol combinations with water to provide solutions of these materials that require no special temperature considerations than those normally encountered in warehousing situations. A wide range of compositions is included to provide formulators flexibility in polymer design and to permit the lowest level of water that is suitable for their particular storage needs. While relatively large amounts of water will effect the fluidity of many of these mixtures, it is desirable to use a minimal amount of water because it becomes waste that must be treated following the synthesis of the polymeric material in condensation polymerization.

Preferred mixtures of NPG and HPHP include those containing between 25 and 75% HPHP. These mixtures in combination with 2–15% water are valuable in providing the degree of fluidity necessary for specific storage needs. The preferred ranges are 50–65% HPHP and 2–7% water. See Tables 1a–e.

Room temperature(24-C) stable mixtures of BEPD and NPG were demonstrated to exist over a composition range of 60–85% BEPD (See Table 2). NPG Glycol may be combined with 25–95% by weight of BEPD and 2-15% water to provide useful mixtures. More preferred are those containing 45-80% BEPD along with 2-7% water. (See Tables 3a-c).

The eutectic composition of HPHP with BEPD is approximately 45% HPHP (See Table 4). In order to provide usable mixtures of BEPD with HPHP, the composition should contain between 20-and 90% BEPD and a water content of 0-15%. Preferred mixtures contain 45-75% BEPD and 2-7% water(See Tables 5a-d).

Viscosity information regarding ternary mixtures of BEPD/NPG Glycol/water and HPHP/NPG Glycol/water is given in Tables 6 and 7.

Also provided by the present invention is an improved process for making polyesters comprised of the residues of the component glycols discussed herein. The polyesters which may be prepared in the process herein include linear, thermoplastic, crystalline or amorphous polyesters produced by conventional polymerization techniques from one or more diols and one or more dicarboxylic acids. The polyesters normally are molding or fiber grade and have an inherent viscosity (I.V.) of about 0.4 to about 1.2.

Suitable diol components of the described polyesters may be selected from ethylene glycol, 1,4-cyclohexanedimethanol, 1,2-propanediol, 1,3-propanediol, 1,4-butanediol, 2,2-dimethyl-1,3-propanediol, 1,6-hexanediol 1,2-cyclohexanediol, 1,4-cyclohexanediol, 1,2-cyclohexanedimethanol, 1,3-cyclohexanedimethanol, Z,8-bis(hydroxymethyl) tricyclo [5.2.1.0]-decane wherein Z represents 3, 4,-or 5;-and diols containing one or more oxygen atoms in the chain, e.g., diethylene glycol, triethylene glycol, dipropylene glycol, tripropylene glycol and the like. In general, these diols contain 2 to 18,-preferably 2-to 8-carbon atoms. Cycloaliphatic diols can be employed in their cis or trans configuration or as mixtures of both forms.

Suitable acid components (aliphatic, alicyclic, or aromatic dicarboxylic acids) of the linear polyester are selected, for example, from terephthalic acid, isophthalic acid, 1,4-cyclohexanedicarboxylic acid, 1,3-cyclohexanedicarboxylic acid, succinic acid, glutaric acid, adipic acid, sebacic acid, 1,12-dodecanedioic acid, 2,6-naphthalenedicarboxylic acid and the like. In the polymer preparation, it is often preferable to use a functional acid derivative thereof such as the dimethyl, diethyl, or dipropyl ester of the dicarboxylic acid. The anhydrides or acid halides of these acids also may be employed where practical.

Preferred polyesters comprise at least about 50 mole percent terephthalic acid residues and at least about 50-mole percent ethylene glycol and/or 1,4-cyclohexanedimethanol residues. Particularly preferred polyesters are those containing from about 75 to 100 mole percent terephthalic acid residues and from about 75 to 100 mole percent ethylene glycol residues.

The linear polyesters may be prepared according to polyester forming conditions well known in the art. For example, a mixture of one or more dicarboxylic acids, preferably aromatic dicarboxylic acids, or ester forming derivatives thereof, and one or more diols may be heated in the presence of esterification and/or polyesterification catalysts at temperatures in the range of about 150° to about 300° C., and pressures of atmospheric to about 0.2 mm Hg. Normally, the dicarboxylic acid or derivative thereof is esterified or transesterified with the diol(s) at atmospheric pressure and at a temperature at the lower end of the specified range. Polycondensation then is effected by increasing the temperature and lowering the pressure while excess diol is removed from the mixture.

Typical catalyst or catalyst systems for polyester condensation are well known in the art. For example, catalysts disclosed in U.S. Patent Nos. 4,025,492; 4,136,089; 4,176,224; 4,238,593; and 4,208,527,incorporated herein by reference, are deemed suitable in this regard. Further, R. E. Wilfong, Journal of Polymer Science, 54 385 (1961) sets forth typical catalysts which are useful in polyester condensation reactions.

The polyester compositions provided by this process are useful in the manufacturing of containers or packages for comestibles such as beverages and food. By the use of known heat setting techniques, certain of the polyesters are, in terms of color, I.V. and heat distortion, stable at temperatures up to about 100° C.. Such stability characteristics are referred to herein as "hot fill" stability. Articles molded from these polyesters exhibit good thin, all rigidity, excellent clarity and good barrier properties with respect to moisture and atmospheric gases, particularly carbon dioxide and oxygen.

The linear polyesters most preferred for use in articles having "hot fill" stability comprise poly(ethylene terephthalate), poly(ethylene terephthalate) wherein up to 5-mole percent of the ethylene glycol residues have been replaced with residues derived from 1,4-cyclohexanedimethanol and poly(ethylene 2,6-naphthalenedicarboxylate), wherein the polyesters have been sufficiently heat set and oriented by methods well known in the art to give a desired degree of crystallinity. By definition, a polymer is "hot fill" stable at a prescribed temperature when less than 2% change in volume of a container manufactured therefrom occurs upon filling the same with a liquid at the temperature. For the manufacture of blow molding beverage bottles, the most preferred polyesters have an I.V. of 0.65 to 0.85 and a Tg of >70° C., and film sections cut from the bottle have a Water Vapor Transmission Rate of 1.5 to 2.5 g mils/100 in.$^2$-24 hours, a Carbon Dioxide Permeability of 20 to 30 cc. mils/100 in.$^2$-24 hours atm., and an Oxygen Permeability of 4 to 8 cc. mils/100 in.$^2$-24 hours-atm. The Tg is determined by Differential Scanning Calorimetry at a scan rate of 20 Centigrade Degrees/min., the Oxygen Permeability by the standard operating procedure of a MOCON OXTRAN 100 instrument of Modern Controls, Inc., of Elk River, Minnesota, and the Carbon Dioxide Permeability by the standard operating procedure of a MOCON PERMATRAN C II, also of Modern Controls.

Other polyesters, suitable for use in coating compositions can also be prepared using the fluid ternary glycol mixtures provided by the present invention.

Thus, as a further aspect of the present invention, there is provided an improved method for preparing polyesters comprised of residues of 2,2-dimethyl 3-hydroxypropyl 2,2-dimethyl 3-hydroxypropionate and 2,2-dimethyl-1,3-propanediol, which comprises
  (A) forming a fluid ternary mixture which comprises
    (a) from about 25-80 weight percent of 2,2-dimethyl 3-hydroxy-propyl 2,2-dimethyl-3-hydroxypropionate;
    (b) from about 2-15-weight percent of water; and
    (c) from about 73-10-weight percent of 2,2-dimethyl 1,3-propanediol; and
  (B) reacting said fluid ternary mixture with a sufficient amount of polyester forming organic acids, followed by recovery of said polyester.

As a further aspect of the present invention, there is provided an improved method for preparing polyesters comprised of residues of 2-butyl 2-ethyl 1,3-propanediol and 2,2-dimethyl 1,3-propanediol, which comprises
(A) forming a fluid ternary mixture which comprises
 (a) from about 60 80-weight percent of 2-butyl-2-ethyl-1,3-propanediol;
 (b) from about 2-15 weight percent of water; and
 (c) from about 28-5-weight percent of 2,2-dimethyl-1,3-propanediol; and
(B) reacting said fluid ternary mixture with a sufficient amount of polyester-forming organic acids, followed by recovery of said polyester.

As a further aspect of the present invention, there is provided an improved method for preparing polyesters comprised of residues of 2-butyl 2-ethyl 1,3-propanediol and 2,2-dimethyl 3-hydroxy propyl 2,2-dimethyl-3-hydroxypropionate, which comprises
(A) forming a fluid ternary mixture which comprises
 (a) from about 45-75 weight percent of 2-butyl-2-ethyl-1,3-propanediol;
 (b) from about 0-15-weight percent of water; and
 (c) from about 25-55 weight percent of 2,2-dimethyl 3-hydroxy propyl 2,2-dimethyl-3-hydroxypropionate; and
(B) reacting said fluid ternary mixture with a sufficient amount of polyester forming organic acids, followed by recovery of said polyester.

EXPERIMENTAL SECTION

Example 1

Into a 500 mL Erlenmeyer flask was placed 120 g NPG Glycol and 180 g HPHP. (In this regard, it is advisable to place the HPHP in the flask first so that melting and mixing can occur before a substantial amount of the NPG Glycol is exposed to heat and thereby lost due to sublimation—of course, the same precautions are advisable with regard to the mixtures of BEPD and NPG Glycol described below. Alternatively, the HPHP(or BEPD) could be melted first and the NPG Glycol stirred in). The flask was placed on a hot plate and allowed to melt. When molten, stirring was initiated to insure uniformity. Four aliquats were removed of 78.4, 77.6, 76.8, and 76.0 g. To these were added 1.6, 2.4, 3.2, and 4.0 g, respectively, of water. After shaking the samples vigorously, they were divided into four equal portions and placed on the benchtop for observation after exposure to room temperature, 4.4° C., and −28° C. The results are summarized in Tables 1a-e.

Example 2

Into a 500 mL Erlenmeyer flask was placed 120 g NPG Glycol and 180-g BEPD. The flask was placed on a hot plate and allowed to melt. When molten, stirring was initiated to insure uniformity. Four aliquats were removed of 78.4, 77.6, 76.8, and 76.0 g. To these were added 1.6, 2.4, 3.2,-and 4.0-g, respectively, of water. After shaking the samples vigorously, they were divided into four equal portions and placed on the benctop for observation after exposure to room temperature, 4.4 C, and −28° C. The results are summarized in Table 2.

Example 3

Into an 8-ounce jar was placed 35 g BEPD and 65 g HPHP. The sample was placed on a hot plate and allowed to melt. When molten, stirring was initiated to insure uniformity. Four aliquats were removed of 19.6, 19.4, 19.2, and 19.0 g. To these were added 0.4, 0.6, 0 8, and 1.0 g, respectively, of water. After shaking the samples vigorously, they were placed on the benchtop for observation. The results are summarized in Tables 3a-c.

Example 4

| Preparation of Resin for Powder Coating | | | |
|---|---|---|---|
| Reactants | Equivalents | Moles | Grams |
| Stage One | | | |
| Neopentyl glycol | 17.058 | 8.529 | 888.4 |
| HPHP | 4.264 | 2.132 | 435.5 |
| Terephthalic Acid | 19.019 | 9.510 | 1579.9 |
| Stage Two | | | |
| Trimellitic Anhydride | 6.852 | 2.284 | 438.8 |
| | Total Reactor Charge | | 3342.6 |
| | Theoretical Amount of Condensate | | 342.6 |
| | Theoretical Yield | | 3000.0 |

Catalyst: 3.0 grams butyl stannoic acid
Color Stabilizer: 1.5 grams triphenyl phosphite

Procedure

Into a 5000-mL, four necked, round bottomed flask, equipped with an overhead stirring device, a steam-heated partial condenser connected to a water trap and a water cooled condensor, was added 789.0-g of a ternary mixture of 55.2% HPHP/36.8% NPG/8.0% water, 598.1 g of NPG, the catalyst and the color stabilizer. This mixture was heated to 90° C. and 1579.9 g terephthalic acid was added. The batch was heated slowly to 230° C. while maintaining a constant rate of distillation of the water produced from the reaction. The temperature was maintained at 230° C. until an acid value of 2.0 or less was reached. The batch was then cooled to 170° C. and 438.8 g trimellitic anhydride was added. The temperature was allowed to rise and adjusted with moderate heat to 185° C.. After one hour at 185° C., the batch was poured out. Typical properties of this resin include a Mn of 2200, a Mw of 7000, a glass transition temperature of 55-60° C., and an lCl viscosity of 200° C. of 15-20° C.

The resin is suitable for use as a powder coating in combination with an epoxy crosslinking resin such as Epon 2002 and suitable additives to effect leveling and cure.

TABLE 1a

MIXTURES OF NPG GLYCOL/HPHP WITH 5% WATER HELD AT ROOM TEMPERATURE

| Wt. % HPHP | Initial Observation | Results of Periodic Checks Over a 66 Day Period |
|---|---|---|
| 40 | solution | Remained a solution with no apparent change |
| 45 | solution | Remained a solution with no apparent change |
| 50 | solution | Remained a solution with no apparent change |
| 55 | solution | Remained a solution with no apparent change |
| 60 | solution | Remained a solution with no apparent change |
| 65 | solution | Remained a solution with no apparent change |
| 70 | solution | Remained a solution with no apparent change |
| 75 | solution | Remained a solution with no apparent change |
| 80 | solution | Remained a solution with no apparent |

TABLE 1a-continued

MIXTURES OF NPG GLYCOL/HPHP WITH 5% WATER HELD AT ROOM TEMPERATURE

| Wt. % HPHP | Initial Observation | Results of Periodic Checks Over a 66 Day Period |
|---|---|---|
| | | change |

Solutions were checked after 1, 2, 3 and 24 hours; 3, 7, 8, 9, 10, 11, 14, 15, 22, 23, 24, 29, 31, 32, and 66 days TABLE 1b

MIXTURES OF NPG GLYCOL/HPHP WITH 10% WATER HELD AT ROOM TEMPERATURE

| Wt. % HPHP | Initial Observation | Results of Periodic Checks Over a 66 Day Period |
|---|---|---|
| 40 | solution | Remained a solution with no apparent change |
| 45 | solution | Remained a solution with no apparent change |
| 50 | solution | Remained a solution with no apparent change |
| 55 | solution | Remained a solution with no apparent change |
| 60 | solution | Remained a solution with no apparent change |
| 65 | solution | Remained a solution with no apparent change |
| 70 | solution | Remained a solution with no apparent change |
| 75 | solution | Remained a solution with no apparent change |
| 80 | solution | Remained a solution with no apparent change |

Solutions were checked after 1, 2, 3 and 24 hours; 3, 7, 8, 9, 10, 11, 14, 15, 22, 23, 24, 29, 31, 32, and 66 days TABLE 1c

MIXTURES OF NPG GLYCOL/HPHP WITH VARIABLE AMOUNTS OF WATER HELD AT 4.4 C.

| Wt. % HPHP | 25 days at 24 C. Wt. % Water | | | | 2 days at 4.4 C. Wt. % Water | | | | 6 days at 4.4 C. Wt. % Water | | | |
|---|---|---|---|---|---|---|---|---|---|---|---|---|
| | 2 | 3 | 4 | 5 | 2 | 3 | 4 | 5 | 2 | 3 | 4 | 5 |
| 70 | s | s | s | s | mc | s/c | s/c | s | c | c | c | s |
| 65 | s | s | s | s | mc | s/c | s | mc | c | c | s/c | c |
| 60 | s | s | s | s | mc | s/c | s | s | c | c | s/c | s/c |
| 55 | s | s | s | s | mc | s/c | s/c | s | c | c | mc | s |
| 50 | s | s | s | s | c | c | mc | s | c | c | s | s/c |

| Wt % HPHP | 7 days at 4.4 C. Wt. % Water | | | | 8 days at 4.4 C. Wt. % Water | | | | 9 days at 4.4 C. Wt. % Water | | | |
|---|---|---|---|---|---|---|---|---|---|---|---|---|
| | 2 | 3 | 4 | 5 | 2 | 3 | 4 | 5 | 2 | 3 | 4 | 5 |
| 70 | c | c | c | s | c | c | c | s | c | c | c | s/c |
| 65 | c | c | s/c | c | c | c | mc | c | c | c | c | c |
| 60 | c | c | s/c | s/c | c | c | mc | mc | c | c | c | c |
| 55 | c | c | c | s | c | c | c | s | c | c | c | s |
| 50 | c | c | s | s/c | c | c | s | mc | c | c | c | mc | s - solution
c - large amount of crystals
s/c - partially crystalline
sl - slurry
ts - thick slurry TABLE 1d

MIXTURES OF NPG GLYCOL/HPHP WITH VARIABLE AMOUNTS OF WATER HELD AT 4.4 C.

| Wt. % HPHP | 12 days at 4.4 C. Wt. % Water | | | | 13 days at 4.4 C. Wt. % Water | | | |
|---|---|---|---|---|---|---|---|---|
| | 2 | 3 | 4 | 5 | 2 | 3 | 4 | 5 |
| 70 | c | c | c | mc | c | c | c | mc |
| 65 | c | c | c | c | c | c | c | c |
| 60 | c | c | c | c | c | c | c | c |
| 55 | c | c | c | s | c | c | c | s |
| 50 | c | c | c | c | c | c | c | c |

| Wt. % HPHP | 19 days at 4.4 C. Wt. % Water | | | | 25 days at 4.4 C. Wt. % Water | | | |
|---|---|---|---|---|---|---|---|---|
| | 2 | 3 | 4 | 5 | 2 | 3 | 4 | 5 |
| 70 | c | c | c | mc | c | c | c | mc |
| 65 | c | c | c | c | c | c | c | c |
| 60 | c | c | c | c | c | c | c | c |
| 55 | c | c | c | s | c | c | c | s |
| 50 | c | c | c | c | c | c | c | c | s - solution
c - large amount of crystals
s/c - partially crystalline
sl - slurry
ts - thick slurry TABLE 1e MIXTURES OF NPG GLYCOL/HPHP WITH VARIABLE AMOUNTS OF WATER HELD AT −28 C. AND ALLOWED TO RETURN TO ROOM TEMPERATURE

| Wt. % HPHP | 48 hr at −28 C. Wt. % Water | | | | 48 hr at −28 C. & 6 days at r.t. Wt. % Water | | | |
|---|---|---|---|---|---|---|---|---|
| | 2 | 3 | 4 | 5 | 2 | 3 | 4 | 5 |
| 70 | c | c | c | c | c | ts | sl | s |
| 65 | c | c | c | c | ts | s | s | s |
| 60 | c | c | c | c | s | s | s | s |
| 55 | c | c | c | c | s | s | s | s |
| 50 | c | c | c | c | sl | sl | s | s |

| Wt. % HPHP | 48 hr at −28 C. & 7 days at r.t. Wt. % Water | | | | 48 hr at −28 C. & 19 days at r.t. Wt. % Water | | | |
|---|---|---|---|---|---|---|---|---|
| | 2 | 3 | 4 | 5 | 2 | 3 | 4 | 5 |
| 70 | c | ts | sl | s | s | ts | sl | s |
| 65 | ts | s | s | s | sl | s | s | s |
| 60 | s | s | s | s | s | s | s | s |
| 55 | s | s | s | s | s | s | s | s |
| 50 | sl | s | s | s | sl | s | s | s | s - solution
c - large amount of crystals
s/c - partially crystalline
sl - slurry
ts - thick slurry

TABLE 2

DETERMINATION OF NPG GLYCOL/BEPD EUTECTIC MIXTURES

| Wt. % BEPD | Time to Crystallize |
|---|---|
| 0 | 3 min. |
| 5 | 3 min. |
| 10 | 5 min. |
| 15 | 5 min. |
| 20 | 5 min. |
| 25 | 12 min. |
| 30 | 13 min. |
| 35 | 25 min. |
| 40 | 38 min. |
| 45 | 60 min. |
| 50 | 55 min. |
| 55 | 140 hr. |
| 60 | >170 hr. |
| 65 | >170 hr. |
| 70 | >170 hr. |
| 75 | >170 hr. |
| 80 | >170 hr. |
| 85 | >170 hr. |
| 90 | >170 hr. |
| 95 | >170 hr. |
| 100 | 120 min. |

TABLE 3a
MIXTURES OF NPG GLYCOL/BEPD WITH VARIABLE AMOUNTS OF WATER HELD AT ROOM TEMPERATURE

| Wt. % HPHP | Initial Observation | Results of Periodic Checks Over a 504 Day Period |
|---|---|---|
| 95 | solution | Remained a solution with no apparent change |
| 90 | solution | Remained a solution with no apparent change |
| 85 | solution | Remained a solution with no apparent change |
| 80 | solution | Remained a solution with no apparent change |
| 75 | solution | Remained a solution with no apparent change |
| 70 | solution | Remained a solution with no apparent change |
| 65 | solution | Remained a solution with no apparent change |
| 60 | solution | Remained a solution with no apparent change |
| 55 | solution | Remained a solution with no apparent change |
| 50 | solution | Remained a solution with no apparent change |

TABLE 3b
MIXTURES OF NPG GLYCOL/BEPD WITH VARIABLE AMOUNTS OF WATER HELD AT 4.4 C.

| Wt. % BEPD | 24 hr at 4.4 C. Wt. % Water | | | | 48 hr at 4.4 C. Wt. % Water | | | | 72 hr at 4.4 C. Wt. % Water | | | |
|---|---|---|---|---|---|---|---|---|---|---|---|---|
| | 2 | 3 | 4 | 5 | 2 | 3 | 4 | 5 | 2 | 3 | 4 | 5 |
| 95 | c | c | c | c | c | c | c | c | c | c | c | c |
| 90 | c | s | c | c | c | c | c | c | c | c | c | c |
| 85 | c | c | c | c | c | c | c | c | c | c | c | c |
| 80 | s/c | s | s | s | c | c | c | s | c | c | c | s |
| 75 | s | s | s | s/c | s | s | s | s | c | s | s/c | s |
| 70 | s | s | s | s | s | s | s | s | s/c | c | s | s |
| 65 | s | s | s | s | s | s | s | s | s | s | s | s |
| 60 | s | s | s | s | s | s | s | s | s | s | s | s |
| 55 | c | s | s | s | c | s | s | s | c | s | s | s |
| 50 | s | s | s | s | s/c | c | s | s | s/c | s | s | s |

| Wt. % BEPD | 96 hr at 4.4 C. Wt. % Water | | | | 168 hr at 4.4 C. Wt. % Water | | | | 192 hr at 4.4 C. Wt. % Water | | | |
|---|---|---|---|---|---|---|---|---|---|---|---|---|
| | 2 | 3 | 4 | 5 | 2 | 3 | 4 | 5 | 2 | 3 | 4 | 5 |
| 95 | c | c | c | c | c | c | c | c | c | c | c | c |
| 90 | c | c | c | c | c | c | c | c | c | c | c | c |
| 85 | c | c | c | c | c | c | c | c | c | c | c | c |
| 80 | c | c | c | s | c | c | c | c | c | c | c | c |
| 75 | c | s | s | s | c | s | c | c | c | s | c | s |
| 70 | s/c | c | s/c | s/c | c | c | c | c | c | c | c | c |
| 65 | s | s | s | s | s | s | s | s | s | s | s | s |
| 60 | s | s | s | s | c | s | s | s | c | s | s | s |
| 55 | c | s | s | s | c | s | s | s | c | c | s | s |
| 50 | c | s | s | c | c | s | s | s | c | c | s | s |

| Wt. % BEPD | 216 hr at 4.4 C. Wt. % Water | | | | 240 hr at 4.4 C. Wt. % Water | | | | 336 hr at 4.4 C. Wt. % Water | | | |
|---|---|---|---|---|---|---|---|---|---|---|---|---|
| | 2 | 3 | 4 | 5 | 2 | 3 | 4 | 5 | 2 | 3 | 4 | 5 |
| 95 | c | c | c | c | c | c | c | c | c | c | c | c |
| 90 | c | c | c | c | c | c | c | c | c | c | c | c |
| 85 | c | c | c | c | c | c | c | c | c | c | c | c |
| 80 | c | c | c | c | c | c | c | c | c | c | c | c |
| 75 | c | s/c | c | s | c | s/c | c | s | c | c | c | c |
| 70 | c | c | c | c | c | c | c | c | c | c | c | c |
| 65 | s | s | s | s/c | c | c | c | c | s | s | s | s |
| 60 | c | s | s | s | c | s | s | s | c | s | s | s |
| 55 | c | c | s/c | s | c | s | s | s | c | c | c | s |
| 50 | c | s | s | s | c | c | c | s | c | c | c | s | s - solution
c - large amount of crystals
s/c - partially crystalline

TABLE 3c
MIXTURES OF NPG GLYCOL/BEPD WITH VARIABLE AMOUNTS OF WATER HELD AT −28 C. FOR 24 HOURS AND HELD AT 24° C. TO OBSERVE RECOVERY OF SOLUTION

| Wt. % BEPD | 24 hr at −28 C. Wt. % Water | | | | 24 hr at −28 C. & 24 hr at 24 C. Wt. % Water | | | | 24 hr at −28 C. & 48 hr at 24 C. Wt. % Water | | | |
|---|---|---|---|---|---|---|---|---|---|---|---|---|
| | 2 | 3 | 4 | 5 | 2 | 3 | 4 | 5 | 2 | 3 | 4 | 5 |
| 95 | c | c | c | c | c | c | c | c | c | c | c | s/c |
| 90 | c | c | c | c | c | c | c | s | c | c | c | s |
| 85 | c | c | c | c | c | c | s | s | c | c | s | s |
| 80 | c | c | c | s | s | c | c | s | s | s | c | c |
| 75 | c | s/c | c | s | c | s/c | c | s | s | s | s | s |
| 70 | c | c | c | c | s | s | s | s | s | s | s | s |
| 65 | c | c | s/c | s | s | s | s | s | s | s | s | s |
| 60 | c | s | s | s | s | s | s | s | s | s | s | s |
| 55 | c | c | c | s | s/c | s | s | s | s/c | s | s | s |
| 50 | c | c | c | c | s | s | s | s | s | s | s | s |

| Wt. % BEPD | 72 hr at 24 C. Wt. % Water | | | | 144 hr at 24 C. Wt. % Water | | | | 168 hr at 24 C. Wt. % Water | | | |
|---|---|---|---|---|---|---|---|---|---|---|---|---|
| | 2 | 3 | 4 | 5 | 2 | 3 | 4 | 5 | 2 | 3 | 4 | 5 |
| 95 | c | c | c | s/c | c | c | c | s/c | c | c | c | s/c |
| 90 | c | c | c | s | c | c | s/c | s | c | c | c | s |
| 85 | c | c | s | s | c | s/c | s | c | c | c | c | s |
| 80 | s | s | s | s | s | s | s | s | s | s | s | s |
| 75 | s | s | s | s | s | s | s | s | s | s | s | s |
| 70 | s | s | s | s | s | s | s | s | s | s | s | s |
| 65 | s | s | s | s | s | s | s | s | s | s | s | s |
| 60 | s | s | s | s | s | s | s | s | s | s | s | s |
| 55 | s/c | s | s | s | s/c | s | s | s | s | s | s | s |
| 50 | s | s | s | s | s | s | s | s | s | s | s | s |

| Wt. % BEPD | 192 hr at 24 C. Wt. % Water | | | | 216 hr at 24 C. Wt. % Water | | | | 240 hr at 24 C. Wt. % Water | | | |
|---|---|---|---|---|---|---|---|---|---|---|---|---|
| | 2 | 3 | 4 | 5 | 2 | 3 | 4 | 5 | 2 | 3 | 4 | 5 |
| 95 | c | c | c | s/c | c | c | c | s/c | c | c | c | s/c |
| 90 | c | c | c | s | c | c | c | s | c | c | c | s |
| 85 | c | s/c | s | s | c | c | s/c | s | c | c | c | s |
| 80 | s | s | s | s | s | s | s | s | s | s | s | s |
| 75 | s | s | s | s | s | s | s | s | s | s | s | s |
| 70 | s | s | s | s | s | s | s | s | s | s | s | s |
| 65 | s | s | s | s | s | s | s | s | s | s | s | s |
| 60 | s | s | s | s | s | s | s | s | s | s | s | s |
| 55 | s | s | s | s | s | s | s | s | s | s | s | s |
| 50 | s | s | s | s | s | s | s | s | s | s | s | s |

| Wt. % BEPD | 312 hr at 24 C. Wt. % Water | | | | 360 hr at 24 C. Wt. % Water | | | | 384 hr at 24 C. Wt. % Water | | | |
|---|---|---|---|---|---|---|---|---|---|---|---|---|
| | 2 | 3 | 4 | 5 | 2 | 3 | 4 | 5 | 2 | 3 | 4 | 5 |
| 95 | c | c | c | s/c | c | c | c | s | c | c | c | s |
| 90 | c | c | c | s | c | c | c | s | c | c | c | s |
| 85 | c | c | c | s | c | c | c | s | c | c | c | s |
| 80 | s | s | s | s | s | s | s | s | s | s | s | s |
| 75 | s | s | s | s | s | s | s | s | s | s | s | s |
| 70 | s | s | s | s | s | s | s | s | s | s | s | s |
| 65 | s | s | s | s | s | s | s | s | s | s | s | s |
| 60 | s | s | s | s | s | s | s | s | s | s | s | s |
| 55 | c | s | s | c | s | s | s | c | s | s | s | s |
| 50 | s | s | s | s | s | s | s | s | s | s | s | s |

| Wt. % BEPD | 456 hr at 24 C. Wt. % Water | | | | 504 hr at 24 C. Wt. % Water | | | |
|---|---|---|---|---|---|---|---|---|
| | 2 | 3 | 4 | 5 | 2 | 3 | 4 | 5 |
| 95 | c | c | c | s | c | c | c | s/c |
| 90 | c | c | c | s | c | c | c | s |
| 85 | c | c | c | s | c | c | s | s |
| 80 | s | s | s | s | s | s | s | s |
| 75 | s | s | s | s | s | s | s | s |

| Wt. % BEPD | 480 hr at 24 C. Wt. % Water | | | | 528 hr at 24 C. Wt. % Water | | | | 552 hr at 24 C. Wt. % Water | | | |
|---|---|---|---|---|---|---|---|---|---|---|---|---|
| | 2 | 3 | 4 | 5 | 2 | 3 | 4 | 5 | 2 | 3 | 4 | 5 |
| 70 | s | s | s | s | s | s | s | s | s | s | s | s |
| 65 | s | s | s | s | s | s | s | s | s | s | s | s |
| 60 | s | s | s | s | s | s | s | s | s | s | s | s |
| 55 | c | s | s | s | c | s | s | s | s | s | s | s |
| 60 | s | s | s | s | s | s | s | s | s | s | s | s |

| Wt. % BEPD | 624 hr at 24 C. Wt. % Water | | | | 672 hr at 24 C. Wt. % Water | | | |
|---|---|---|---|---|---|---|---|---|
| | 2 | 3 | 4 | 5 | 2 | 3 | 4 | 5 |
| 70 | s | s | s | s | s | s | s | s |
| 65 | s | s | s | s | s | s | s | s |
| 60 | s | s | s | s | s | s | s | s |
| 55 | s | s | s | s | s | s | s | s |

TABLE 3c-continued

MIXTURES OF NPG GLYCOL/BEPD WITH VARIABLE AMOUNTS OF WATER HELD AT −28 C. FOR 24 HOURS AND HELD AT 24° C. TO OBSERVE RECOVERY OF SOLUTION

| 50 | s | s | s | s | s | s | s | s |
|---|---|---|---|---|---|---|---|---| s - solution
c - crystallized
slc - slightly crystallized
s/c - partially crystalline

TABLE 4

DETERMINATION OF HPHP/BEPD EUTECTIC MIXTURES

| Wt. % BEPD | Time to Crystallize |
|---|---|
| 35 | <2 days |
| 40 | <1 day |
| 45 | <1 day |
| 50 | 6 days |
| 55 | >2 wks solidified after cooling to 4.4 C. for 168 hr. |
| 60 | >2 wks solidified after cooling to 4.4 C. for 48 hr. |
| 65 | >2 wks solidified after cooling to 4.4 C. for 24 hr. |
| 70 | <3 days |
| 75 | <3 days |

TABLE 5a

MIXTURES OF HPHP/BEPD WITH VARIABLE AMOUNTS OF WATER HELD AT ROOM TEMPERATURE

| Wt. % % BEPD | 2 hr at 24 C. Wt. % Water | | | | 36 hr at 24 C. Wt. % Water | | | |
|---|---|---|---|---|---|---|---|---|
| | 2 | 3 | 4 | 5 | 2 | 3 | 4 | 5 |
| 75 | s | s | s | s | s | s | s | s |
| 70 | s | s | s | s | s | s | s | s |
| 65 | s | s | s | s | s | s | s | s |
| 60 | s | s | s | s | s | s | s | s |
| 55 | s | s | s | s | s | s | s | s |
| 50 | s | s | s | s | s | s | s | s |
| 45 | s | s | s | s | s | s | s | s |
| 40 | s | s | s | s | s | s | s | s |
| 35 | s | s | s | s | s | s | s | s | s - solution

TABLE 5b

MIXTURES OF HPHP/BEPD WITH VARIABLE AMOUNTS OF WATER HELD AT 4.4 C.

| Wt. % % BEPD | 16 hr at 4.4 C. Wt. % Water | | | | 23.5 hr at 4.4 C. Wt. % Water | | | | 40 hr at 4.4 C. Wt. % Water | | | |
|---|---|---|---|---|---|---|---|---|---|---|---|---|
| | 2 | 3 | 4 | 5 | 2 | 3 | 4 | 5 | 2 | 3 | 4 | 5 |
| 75 | c | s/c | s | s/c | c | c | c | c | c | c | slc | c |
| 70 | s | s | s | s | s/c | s | s/c | s | c | s | s/c | s |
| 65 | s | s | s | s | s | s | s | s | s/c | s | s | s |
| 60 | s | s | s | s | s/c | s | s | s | s/c | s | s | s |
| 55 | s | s | s | s | s | s | s | s | s | s | s | s |
| 50 | s | s | s | s | s | s | s | s | s | s | s | s |
| 45 | s/c | s | s | s | s/c | s | s | s | s/c | s | s | s |
| 40 | s | s | s | s | s | s | s | s | s | s | s | s |
| 35 | s | s | s | s | s | s | s | s | s | s | s | s | s - solution
c - crystallized
slc - slight crystallization
s/c - partial crystallization

TABLE 5c

MIXTURES OF HPHP/BEPD WITH VARIABLE AMOUNTS OF WATER HELD AT −28 C.

| Wt. % % BEPD | 9.5 hr at −28 C. Wt. % Water | | | | 24 hr at −28 C. Wt. % Water | | | | 33 hr at −28 C. Wt. % Water | | | |
|---|---|---|---|---|---|---|---|---|---|---|---|---|
| | 2 | 3 | 4 | 5 | 2 | 3 | 4 | 5 | 2 | 3 | 4 | 5 |
| 75 | c | c | c | c | c | c | c | c | c | c | slc | c |
| 70 | c | c | c | c | c | c | c | c | c | c | c | c |
| 65 | c | c | c | s/c | c | c | c | c | c | c | c | s/c |
| 60 | c | c | c | c | c | c | c | c | c | c | c | c |
| 55 | s/c | s/c | s/c | slc | c | c | s/c | slc | c | c | s/c | slc |
| 50 | s/c | slc | slc | slc | c | s/c | slc | slc | c | c | c | s/c |
| 45 | c | s/c | slc | slc | c | c | s/c | slc | c | c | c | s/c |
| 40 | c | c | s/c | slc | c | c | c | s/c | c | c | c | c |
| 35 | c | c | c | c | c | c | c | c | c | c | c | c | s - solution
c - crystals
slc - slight crysatllization
s/c - partial crystallization

TABLE 5d

MIXTURES OF HPHP/BEPD WITH VARIABLE AMOUNTS OF WATER HELD AT ROOM TEMPERATURE FOLLOWING FREEZING AT −28 C. FOR 33 HR

| Wt. % % BEPD | 21 at 24 C. Wt. % Water | | | | 44 hr at 24 C. Wt. % Water | | | |
|---|---|---|---|---|---|---|---|---|
| | 2 | 3 | 4 | 5 | 2 | 3 | 4 | 5 |
| 75 | c | c | sl | s | c | c | sl | s |
| 70 | c | c | s | s | tsl | tsl | s | s |
| 65 | sl | s | s | s | sl | s | s | s |
| 60 | s | s | s | s | s | s | s | s |
| 55 | s | s | s | s | s | s | s | s |
| 50 | s | s | s | s | s | s | s | s |
| 45 | c | slc | s | s | tsl | s | s | s |
| 40 | c | c | slc | s | c | tsl | s | s |
| 35 | c | c | c | s | c | tsl | sl | s | s - solution
c - crystallized
tsl - thick slurry
slc - slight crystallization
sl - slurry

TABLE 6

BROOKFIELD VISCOSITY VALUES FOR TERNARY MIXTURES OF NPG GLYCOL/HPHP/WATER AT ROOM TEMPERATURE USING SPINDLE 27 AT 30 RPM

| Wt. % HPHP | 2 | 3 | 4 | 5 |
|---|---|---|---|---|
| 70 | 681 | 585 | 454 | 374 |
| 65 | 628 | 628 | 461 | 354 |
| 60 | 688 | 594 | 528 | 444 |
| 55 | 768 | 638 | 508 | 414 |
| 50 | 648 | 551 | 438 | 347 |

A Brookfield Model DV-III Programmable Rheometer was used to make the determinations

TABLE 7

BROOKFIELD VISCOSITY VALUES FOR TERNARY MIXTURES OF NPG GLYCOL/BEPD/WATER AT ROOM TEMPERATURE USING SPINDLE 27 AT 30 RPM

| Wt. % BEPD | 2 | 3 | 4 | 5 |
|---|---|---|---|---|
| 95 | 421 | 289 | 274 | 219 |
| 90 | 451 | 312 | 286 | 224 |
| 85 | 448 | 286 | 276 | 227 |
| 80 | 384 | 304 | 286 | 232 |
| 75 | 421 | 292 | 282 | 234 |
| 70 | 428 | 354 | 294 | 272 |
| 65 | 565 | 347 | 319 | 259 |
| 60 | 608 | 322 | 316 | 267 |
| 55 | 668 | 332 | 316 | 281 |
| 50 | 391 | 334 | 334 | 276 |

A Brookfield Model DV-III Programmable Rheometer was used to make the determinations

I claim:

1. A fluid ternary blend of glycols which comprises
   (a) from about 60-80 weight percent of 2-butyl-2-ethyl-1,3-propanediol;
   (b) from about 2-15 weight percent of water; and
   (c) from about 28-5 weight percent of 2,2-dimethyl-1,3-propanediol.

2. The fluid ternary blend of claim 1, wherein component (a) is present in a range of about 45-80 weight percent and component (b) is present in a range of about 2-7 weight percent.

3. An improved method for preparing polyesters comprised of residues of 2,2-dimethyl-3-hydroxypropyl 2,2-dimethyl-3-hydroxypropionate and 2,2-dimethyl-1,3-propanediol, which comprises
   (A) forming a fluid ternary mixture which comprises
      (a) from about 25-75 weight percent of 2,2-dimethyl-3-hydroxy-propyl 2,2-dimethyl-3-hydroxypropionate;
      (b) from about 2-15 weight percent of water; and
      (c) from about 73-10 weight percent of 2,2-dimethyl-1,3-propanediol; and
   (B) reacting said fluid ternary mixture with a sufficient amount of polyester-forming organic acids, said organic acids selected from the group consisting of terephthalic acid, isophthalic acid, 1,4-cyclohexanedicarboxylic acid, 1,3-cyclohexanedicarboxylic acid, succinic acid, glutaric acid, adipic acid, sebacic acid, 1,12-dodecanedioic acid, and 2,6-naphthalenedicarboxylic acid, or a $C_1$–$C_3$ alkylester, anhydride, or acid halide thereof; followed by recovery of said polyester.

4. An improved method for preparing polyesters comprises of residues of 2-butyl-2-ethyl-1,3-propanediol and 2,2-dimethyl-1,3-propanediol, which comprises
   (A) forming a fluid ternary mixture which comprises
      (a) from about 60-80 weight percent of 2-butyl-2-ethyl-1,3-propanediol;
      (b) from about 2-15 weight percent of water; and
      (c) from about 28-5 weight percent of 2,2-dimethyl-1,3-propanediol; and
   (B) reacting said fluid ternary mixture with a sufficient amount of polyester-forming organic acids, said organic acids selected from the group consisting of terephthalic acid, isophthalic acid, 1,4-cyclohexanedicarboxylic acid, 1,3-cyclohexanedicarboxylic acid, succinic acid, glutaric acid, adipic acid, sebacic acid, 1,12-dodecanedioic acid, and 2,6-naphthalenedicarboxylic acid, or a $C_1$–$C_3$ alkylester, anhydride, or acid halide thereof; followed by recovery of said polyester.

* * * * *